(12) United States Patent
Yamaguchi et al.

(10) Patent No.: US 7,003,208 B2
(45) Date of Patent: Feb. 21, 2006

(54) OPTICAL FIBER CONNECTING TOOL, CONNECTOR HOLDER, CONNECTOR HOLDER EQUIPPED OPTICAL CONNECTOR, AND TOOL EQUIPPED OPTICAL CONNECTOR

(75) Inventors: Takashi Yamaguchi, Sakura (JP); Kazuhiro Takizawa, Sakura (JP); Hiroshi Furukawa, Sakura (JP); Daigo Saito, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/857,748

(22) Filed: Jun. 1, 2004

(65) Prior Publication Data

US 2005/0129378 A1    Jun. 16, 2005

(30) Foreign Application Priority Data

Jun. 3, 2003 (JP) .............................. 2003-158729
Sep. 4, 2003 (JP) .............................. 2003-313212

(51) Int. Cl.
   *G02B 6/00* (2006.01)
(52) U.S. Cl. ...................................... 385/134; 385/147
(58) Field of Classification Search ................ 385/134, 385/147, 5, 3, 70–72, 76–78
   See application file for complete search history.

(56) References Cited

U.S. PATENT DOCUMENTS 5,150,230 A * 9/1992 Masuko et al. ............... 359/34
5,682,450 A * 10/1997 Patterson et al. ............. 385/65
6,503,422 B1 * 1/2003 Chudoba et al. ............ 264/1.25
6,872,008 B1 * 3/2005 Takeda et al. ................ 385/60
2004/0190849 A1 * 9/2004 Chamorro et al. .......... 385/134

FOREIGN PATENT DOCUMENTS

| JP | 410123347 | * | 5/1998 |
| JP | 2002-023006 A | | 1/2002 |
| JP | 2002-055259 A | | 2/2002 |
| JP | 02002071999 | * | 3/2002 |
| JP | 02003322762 | * | 11/2003 |
| WO | WO009713171 | * | 4/1997 |

* cited by examiner

*Primary Examiner*—Ellen E. Kim
(74) *Attorney, Agent, or Firm*—Sughrue Mion, PLLC

(57) ABSTRACT

An optical fiber connecting tool for an optical connector which houses a ferule, a first optical fiber mounted in the ferule and extending from a back end of the ferule, and a second optical fiber abutted and connected to the first optical fiber. The optical connector includes a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring. The optical fiber connecting tool includes an insertion member for maintaining a state in which the second optical fiber is insertable into and removable from the space between the half split elements by being wedged into the space from outside of the clamping portion so as to expand the space between the half split elements, and an insertion member operating portion, having a ring shape, for extracting the insertion member disposed between the half split elements of the clamping portion from the clamping portion.

15 Claims, 13 Drawing Sheets

OPTICAL FIBER CONNECTING TOOL, CONNECTOR HOLDER, CONNECTOR HOLDER EQUIPPED OPTICAL CONNECTOR, AND TOOL EQUIPPED OPTICAL CONNECTOR

BACKGROUND OF THE INVENTION

1. Field of the Invention

The present invention relates to an optical fiber connecting tool having a mechanism for connecting optical fibers together and used for an optical connector which is easily assembled with an optical fiber at a distal end of the optical fiber using the mechanism, and also relates to a connector holder, a connector holder equipped optical connector, and a tool equipped optical connector.

Priority is claimed on Japanese Patent Application No. 2003-158729, filed Jun. 3, 2003, and Japanese Patent Application No. 2003-313212, filed Sep. 4, 2003, the contents of which are incorporated herein by reference.

2. Description of Related Art

In recent years, an optical connector that allows carrying out the operation of the attachment to the distal end of an optical fiber at a connection site outside a factory is known. For example, there is an optical connector including a ferule in which an optical fiber is housed in advance and polished at a distal end surface thereof, and a clamping portion disposed at the back (the position opposite to the distal end surface) of the ferule. The optical fiber housed in the ferule and another optical fiber to be connected are abutted and connected at the clamping portion by clamping these optical fibers in half split elements of the clamping portion, so that assembling of the optical connector in a short time is allowed. Here, because the size of the clamping portion is small, a dedicated tool that carries out opening and closing the elements (optical connector assembling tool) has been proposed (refer, for example, to Japanese Unexamined Patent Application, First Publication No.2002-23006 and Japanese Unexamined Patent Application, First Publication No. 2002-55259).

However, it is necessary that the optical connector attachment tool having the structure described above be precisely formed so that a wedge that has undergone high precision processing can be correctly inserted and released between the small-sized elements in order to realize the operation of the clamping portion of the optical connector, and thus there is a problem in that cost reductions are difficult. In addition, in the clamping portion described above, a comparatively great effort is required in both the insertion and release of the wedge in the elements due to the clamping force of a spring that imparts a clamping force to the elements, and thus in consideration of this point, the optical connector assembling tool described above must function so that the insertion and release operability of the wedge in the elements is guaranteed, and thus there are problems in that downsizing and cost reductions are difficult. With regard to size, the optical connector assembling tool described above may also encounter a case in which the optical connector assembling tool cannot be inserted in a narrow operation space such as a device casing. In addition, when a connector is to be attached to a distal end of an optical fiber using the optical connector assembling tool disposed outside a device casing, there may be disadvantage in that it is necessary that the extra extraction length for extracting the optical fiber from the device casing be guaranteed.

SUMMARY OF THE INVENTION

In consideration of the above problems, an object of the present invention is to provide an optical fiber connecting tool which enables assembling operation of an optical connector to a distal end of an optical fiber at low cost, and to provide a connector holder, an optical holder equipped optical connector, and tool equipped optical connector.

The present invention provides the structure described below in order to achieve the objects and to solve the problems described above.

A first aspect of the present invention provides an optical fiber connecting tool for an optical connector which houses a ferule, a first optical fiber mounted in the ferule and extending from a back end of the ferule, and a second optical fiber abutted and connected to the optical fiber, the optical connector including a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring, the optical fiber connecting tool including: an insertion member for maintaining a state in which the second optical fiber is insertable into and removable from the space between the half split elements by being wedged into the space from outside of the clamping portion so as to expand the space between the half split elements; an insertion member operating portion, having a ring shape, for extracting the insertion member disposed between the half split elements of the clamping portion from the clamping portion; and a stopper wall, included in a periphery of the insertion member operating portion, to which the optical connector is abutted when the insertion member is extracted from the clamping portion of the optical connector, wherein the insertion member projects to an outer surface side of the stopper wall from a movable end portion, which is an end portion of the insertion member operating portion located opposite to the stopper wall of the insertion member operating portion, through an insertion member window formed in the stopper wall, and when lateral opposing forces are applied to portions of the insertion member operating portion located between the stopper wall and the movable end portion, the insertion member operating portion deforms such that a distance between the stopper wall and the movable end portion increases so that the insertion member is moved such that an amount of projection of the insertion member from the stopper wall decreases or projection of the insertion member from the stopper wall is eliminated.

The connector holder may further include a holder body having a groove-shaped accommodation recess that accommodates the optical connector. The insertion member operating portion may have a polygonal shape that has a concave portion as viewed in a direction along which groove-shaped accommodation recess extends. The stopper wall may form a portion of the concave portion.

In addition, a second aspect of the present invention provides a connector holder including: a holder body having a groove-shaped accommodation recess for accommodating an optical connector which houses a ferule, a first optical fiber mounted in the ferule and extending from a back end of the ferule, and a second optical fiber abutted and connected to the optical fiber, the optical connector including a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring; an insertion member operating portion, having a ring shape, in which the holder body is included as a portion of a periphery thereof; and an insertion member projecting from a movable end portion, which is an end portion of the insertion member operating portion located opposite to the holder body, into the accommodation recess, for maintaining a state in which the second optical fiber is insertable into and removable from the space between the half split elements by being wedged into the space from outside of the clamping portion so as to expand the space between the half split elements, wherein the insertion member operating portion extracts the insertion member disposed between the half split elements from the space between the half split elements by being applied lateral opposing forces to portions of the insertion member operating portion located between the holder body and the movable end portion, and thereby deforming such that a distance between the movable end portion and the holder body.

The deformation of the insertion member operating portion is preferably an elastic deformation.

In the connector holder according to the present invention, the insertion member operating portion can also have a structure in which the insertion member operating portion can deform as a whole due to lateral pressure acting from both sides opposite to the portion positioned between the movable end portion and the holder body, and thereby the distance between the movable end portion and the holder body increases. In addition, the insertion member operating portion can have a structure in which the holder body and the movable end portion joined due to a pair of joining walls having a configuration in which two connecting plates are joined by a hinge portion, or can have a structure in which a pair of joining wall portions deform equally due to the lateral pressure acting on the insertion member operating portion and thereby the insertion members are moved linearly towards the optical connector held in the holder body. In addition, a structure can be used in which insertion members that are to be wedged between elements of the clamping portion can be erected in plurality on the movable end portion.

In the connector holder, a convex portion, which is engageable with a retainer for holding the optical connector in the accommodation recess, may be formed on an end of the holder body located opposite to the insertion member operating portion. In addition, an engagement grove, which is engageable with a retainer for holding the optical connector in the accommodation recess, may be formed in an end of the holder body located opposite to the insertion member operating portion.

In addition, the present invention provides a connector holder equipped optical connector including: an optical connector which houses a ferule, a first optical fiber mounted in the ferule and extending from a back end of the ferule, and a second optical fiber abutted and connected to the optical fiber, the optical connector including a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring; and a connector holder according to the second aspect on the optical connector, wherein the insertion member of the connector holder is disposed between the half split elements of the clamping portion.

In addition, the present invention provides a tool equipped optical connector including: an optical connector which houses a ferule, a first optical fiber mounted in the ferule and extending from a back end of the ferule, and a second optical fiber abutted and connected to the optical fiber, the optical connector including a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring; and an optical fiber connecting tool according the first aspect, wherein the insertion member is disposed between the half split elements of the clamping portion of the optical connector.

In addition, a third aspect of the present invention provides an optical fiber connecting tool for a clamping portion having half split elements for maintaining connection between optical fibers which are abutted and connected by clamping the optical fibers in a space between the half split elements using elastic force of a spring, the optical fiber connecting tool including: an insertion member for maintaining a state in which one of the optical fibers is insertable into and removable from the space between the half split elements by being wedged into the space from outside of the clamping portion so as to expand the space between the half split elements; an insertion member operating portion for extracting the insertion member disposed between the half split elements of the clamping portion from the clamping portion; and a stopper wall, joining peripheral ends of the insertion member operating portion, to which the clamping portion is abutted when the insertion member is extracted from the clamping portion, wherein the insertion member projects to an outer surface side of the stopper wall from a movable end portion, which is an end portion of the insertion member operating portion located opposite to the stopper wall of the insertion member operating portion, through an insertion member window formed in the stopper wall, and when lateral opposing forces are applied to portions of the insertion member operating portion located between the stopper wall and the movable end portion, the insertion member operating portion deforms such that a distance between the stopper wall and the movable end portion increases so that the insertion member is moved such that an amount of projection of the insertion member from the stopper wall decreases or projection of the insertion member from the stopper wall is eliminated.

In the optical fiber connecting tool described above, the stopper wall may be provided on a holder body which accommodates the clamping portion.

The present invention further provides a tool equipped optical connector including: a clamping portion having half split elements for maintaining connection between optical fibers which are abutted and connected by clamping the optical fibers in a space between the half split elements using elastic force of a spring; and an optical fiber connecting tool according to the third aspect attached to the clamping portion so as to maintain a state in which one of the optical fibers is insertable into and removable from the space between the half split elements by inserting the insertion member into the space from outside of the optical connector so as to expand the space between the half split elements.

The "stopper wall" in the first and third aspects of the invention functions to realize the smooth extraction of the insertion member from the space between the elements by preventing movement in which the optical connector follows the insertion member when the insertion member is extracted from the space between the elements of the clamping portion of the optical connector by operating the insertion member operating portion.

The "holder body" according to the second aspect of the invention also has a function similar to that of the stopper wall described above, and in the present specification, the term "stopper wall" also includes the holder body. The connector holder according to the present invention doubles as an optical fiber connection tool according to the present invention. In addition, the connector holder equipped optical connector according to the present invention doubles as the tool equipped optical connector according to the present invention.

In the present invention, the distance between the movable end portion and the stopper wall is increased by applying lateral pressure from both sides opposite to the part of the insertion member operating portion positioned between the movable end portion and the stopper wall (below, referred to as side portion; there are a pair of side portions positioned between the movable end portion and the stopper wall on the ring-shaped insertion member operating portion), and elastically deforming the insertion member operating portion so as to make the end portions on both sides of the insertion member operating portion approach each other. Thereby, the insertion members that have been placed between the elements can be extracted from between the elements. The insertion member operating portion functions so that the lateral pressure acting on the insertion member operating portion is transformed to a force in the direction perpendicular to the lateral pressure, and thus the insertion members can be extracted from between the elements. The insertion member operating portion functions to realize extraction of the insertion members from between the elements by a weak force in comparison to extracting the insertion members from between the elements directly.

In the present invention, in comparison to a conventional dedicated tool, it is possible to realize a connection between optical fibers in the clamping portion that does not use a conventional dedicated tool by using a connector holder equipped optical connector (or a tool equipped optical connector) that is attached by using a connector holder (or an optical fiber connecting tool) having a structure that is extremely simple and can be downsized. Thereby, it is possible to realize the attachment of the optical connector to the distal end of the optical fiber easily. In addition, the structure of the optical fiber connecting tool and connector holder is extremely simple, and furthermore can be fabricated inexpensively. Thus, in comparison to using a dedicated tool, it is possible to realize large reductions in cost.

Furthermore, the connector holder equipped optical connector and the tool equipped optical connector can realize the attachment of the optical connector to the distal end of the optical fiber simply by extracting the insertion members from the clamp of the optical connector by operating the insertion member operating portion after inserting the optical fiber into the clamping portion of the optical connector, and thus the operation of carrying out precise positioning and support by fitting the optical connector into the holder portion, which requires using a conventional dedicated tool, becomes unnecessary, and thus the attachment operation becomes extremely simple.

In addition, in the present invention, the insertion member operating portion functions to convert the lateral pressure acting on the insertion member operating portion to a force in a direction perpendicular to the lateral pressure and extract the insertion members from between the elements, and thus in comparison to extracting the insertion members from between the elements directly, the extraction of the insertion members from between the elements can be realized by a weak force. Thereby, the extraction of the insertion members from between the elements can be carried out simply and comfortably. In addition, the insertion member operating portion has an extremely simple structure, and thus the optical connector equipped insertion member tool, a connector holder, a connector holder equipped optical connector, a connector holder equipped optical connector, and a tool equipped optical connector can be downscaled.

DETAILED DESCRIPTION OF THE INVENTION

An embodiment of the present invention will be explained below with reference to the appended drawings.

Figure 1:
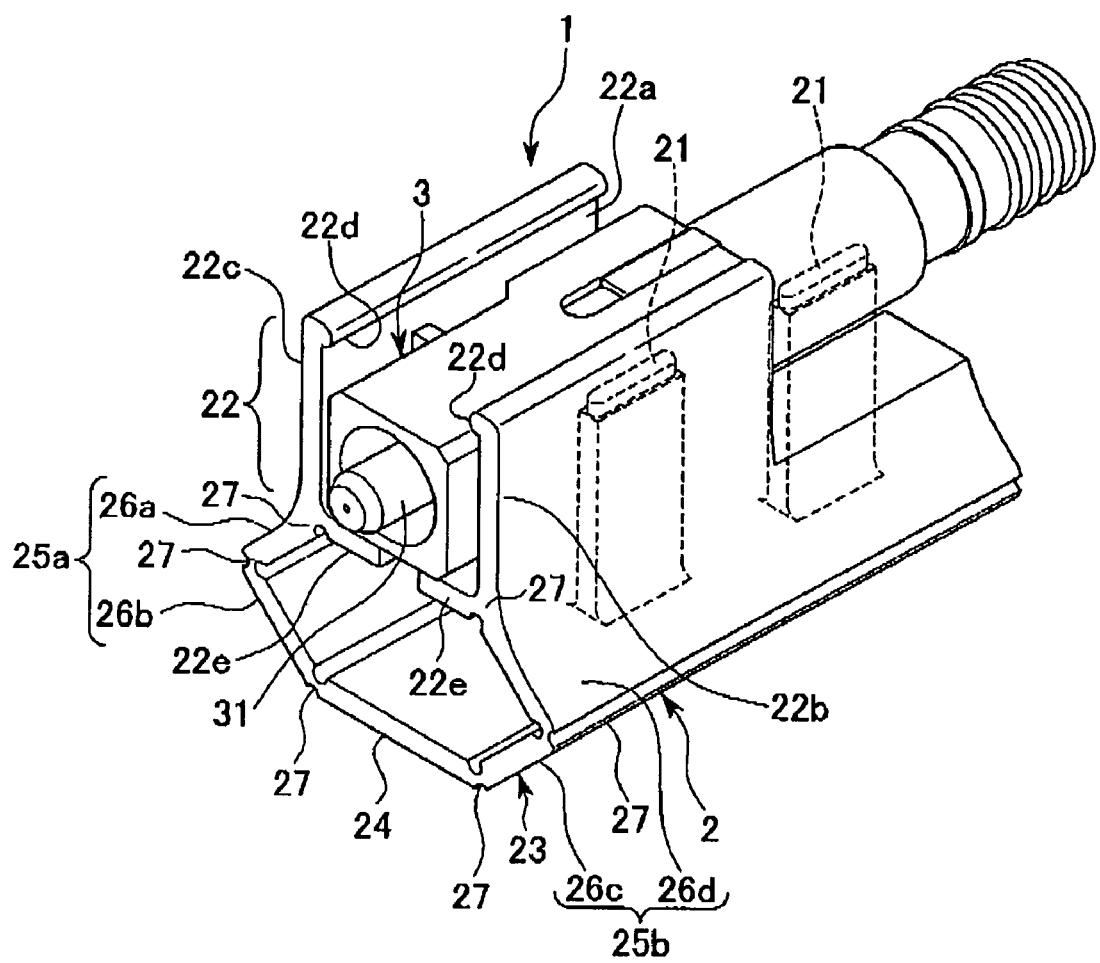
FIG. 1 is a perspective view showing a connector holder equipped optical connector and a connector holder according to an embodiment of the present invention.
Figure 2:
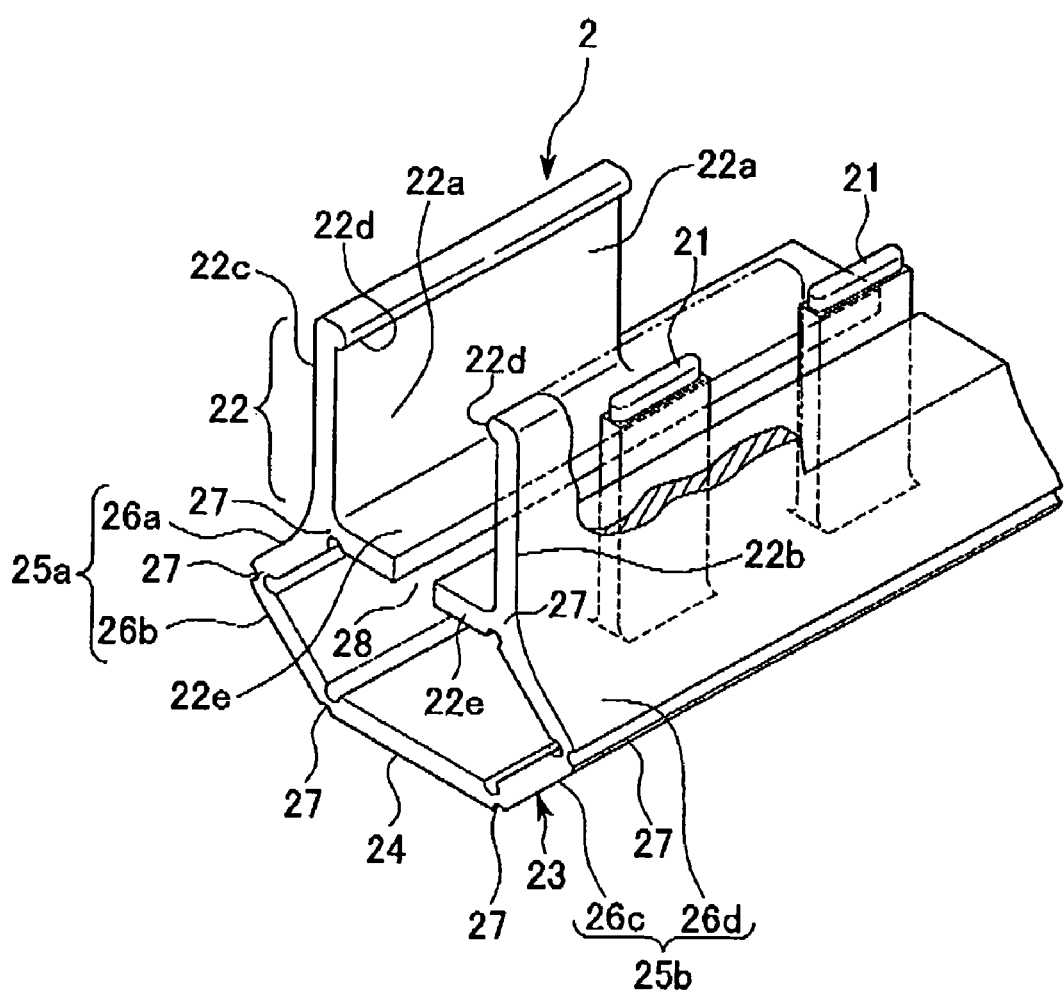
FIG. 2 is a perspective view showing the connector holder shown in FIG. 1.
Figure 3:
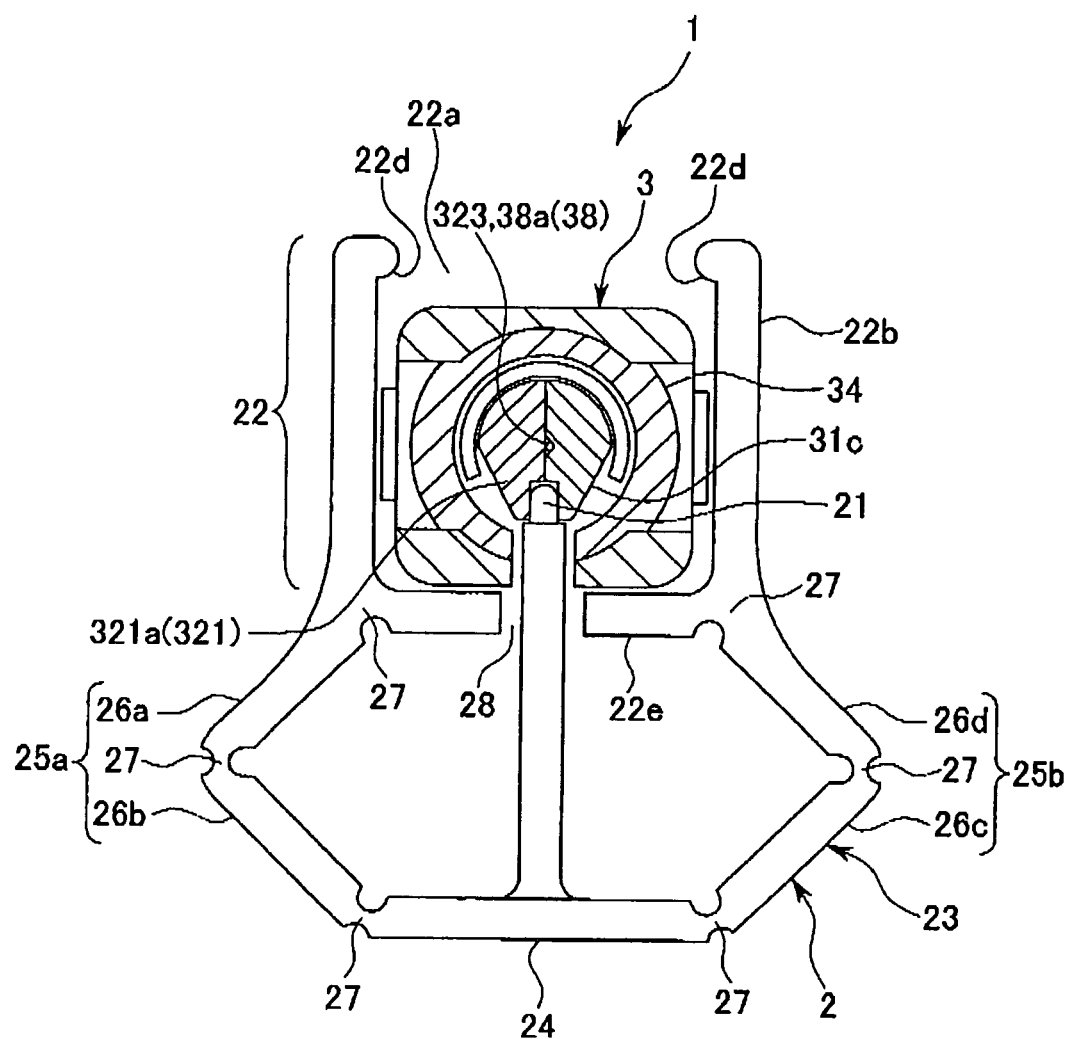
FIG. 3 is a drawing showing a state in which insertion members are extracted from a clamping portion of the optical connector (an optical connector plug) by applying lateral pressure to an insertion member operating portion of the connector holder of the connector holder equipped optical connector so as to deform the insertion member operating portion.
Figure 4:
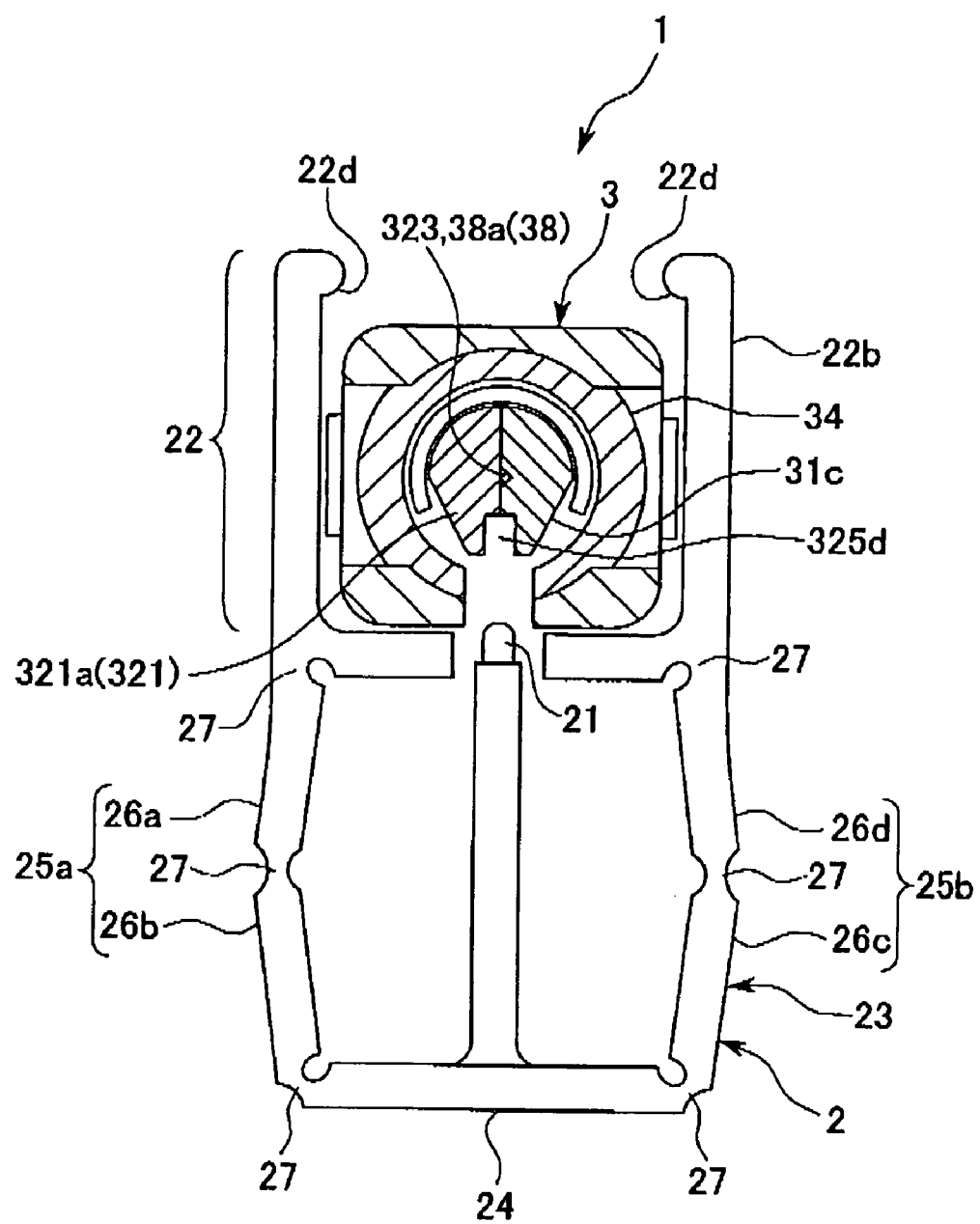
FIG. 4 is a perspective view showing the holder equipped connector holder shown in FIG. 1.

FIG. 1 is a perspective view showing the connector holder equipped optical connector 1 (a tool equipped optical connector) and the connector holder 2 (an optical fiber connector tool) according to an embodiment of the present invention; FIG. 2 is a perspective view showing the connector holder 2; FIG. 3 is a front view showing the connector holder equipped optical connector 1 and the connector holder 2 viewed in a partial cross-section; and FIG. 4 is a drawing showing a state in which insertion members 21 are extracted from a clamping portion 32 of the optical connector 3 (an optical connector plug) by applying lateral pressure to the insertion member operating portion 23 shown in FIG. 3 so as to deform the insertion member operating portion 23.

As shown in FIG. 1 to FIG. 3, the connector holder equipped optical connector 1 is formed by mounting the connector holder 2 on the outside of the optical connector 3. The optical connector plug 3 in the illustrated example is what is termed SC2 type optical connector, and from the SC type optical connector (SC: single fiber coupling optical fiber connector, such as an F04 type optical connector (optical connector plug) defined in the JIS C 5973), the latch mounted on the outside of the plug frame 33 (refer to FIG. 5) of the SC type optical connector is omitted. Note that the optical connector 3 is not limited to the SC2 type optical connector described above, but various optical connectors such as a single core type optical connector plug, a multiple-core type optical connector plug, or the like may be used.

First, the optical connector 3 will be explained.

Figure 5:
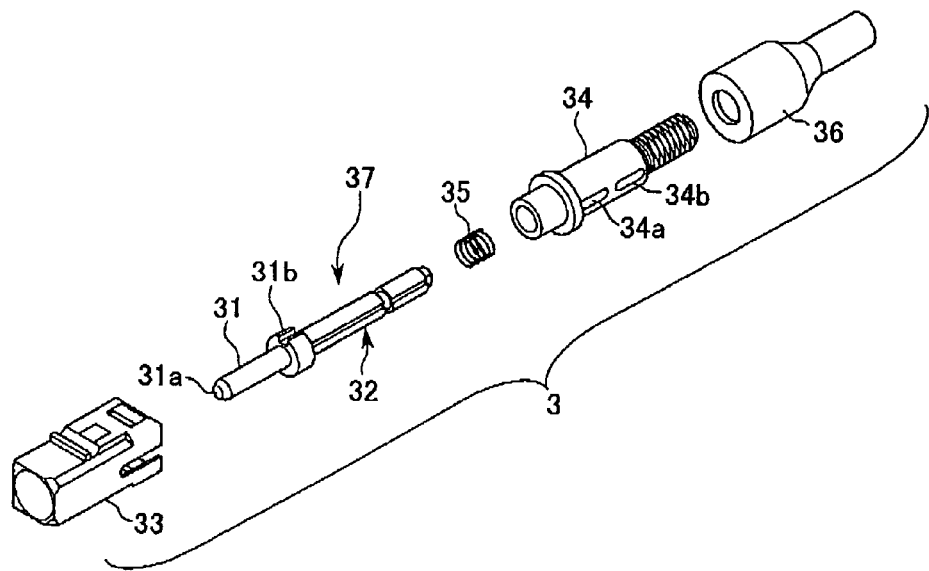
FIG. 5 is an exploded perspective view of the optical connector (optical connector plug) that forms the connector holder equipped optical connector shown in FIG. 1.
Figure 6:
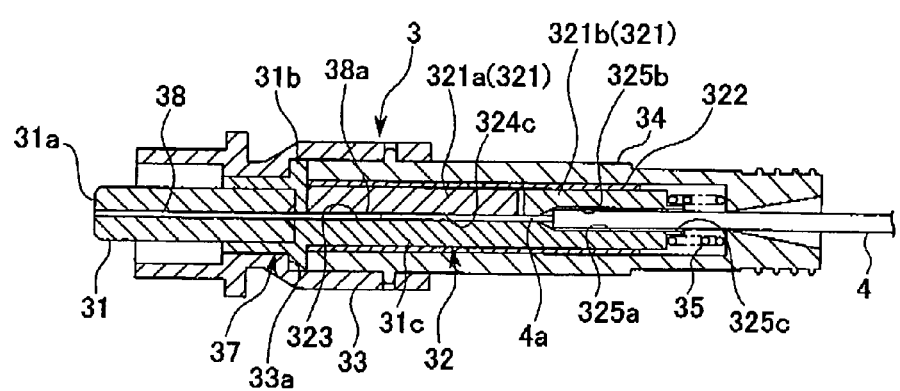
FIG. 6 is a cross-sectional view showing the optical connector (optical connector plug) shown in FIG. 5.

FIG. 5 and FIG. 6 are drawings showing the structure of the optical connector 3, in particular, FIG. 5 is an exploded perspective view and FIG. 6 is a cross-sectional view. In FIGS. 5 and 6, the optical connector 3 includes a ferule 31; a clamping portion 32 that is disposed at the back end side opposite to the connection surface end (reference symbol 31a; the distal end surface) of the ferule 31; a sleeve shaped plug frame 33 that on the is mounted outside the ferule 31 so as to accommodate the ferule 31 while restraining rotation of the ferule 31 about the axis thereof; a stop ring 34 that is attached by engagement to the back end (right side in FIG. 6) of the plug frame 33 and accommodates the clamping portion 32; and a spring 35 that is mounted inside the stop ring 34.

Note that reference symbols 34a and 34b denote the insertion opening in which the insertion members 21 (refer to FIG. 4 and the like) of the connector holder 2 (release member), and reference symbol 36 denotes boots mounted on the back end of the stop ring 34.

The clamping portion 32 is formed by attaching plural members to an extension portion 31c that extends from a flange portion 31b of the ferule 31 towards the back end side of the optical connector 3. The clamping portion 32 is integrally formed with the ferule 31, and hereinafter, the ferule 31 to which the clamping portion 32 is attached may be referred to as a "clamping portion equipped ferule 37".

The clamping portion 32 of the clamping portion equipped ferule 37 is accommodated in the stop ring 34 while being allowed to freely move in the axial direction of the sleeve shaped stop ring 34. The spring 35 receives a reaction force from the back end side of the stop ring 34 to press the distal end side (the left side in FIG. 6) of the optical connector 3, and thereby the entire clamping portion equipped ferule 37 is urged towards the back end side of the optical connector 3, and for example, when the optical connector 3 is connected to a separate optical connector by being inserted into an optical connector adaptor or the like, the spring 35 functions to impart an abutment force between the optical connector 3 and the optical connector on the connection partnering side.

Note that further movement (the movement relative to the stop ring 34) of the clamping portion equipped ferule 37 towards the back end side of the optical connector 3 with respect to the stop ring 34 is restrained by the flange portion 31b of the ferule 31 abutting the stopper projection 33a that projects in the plug frame 33.

Figure 7:
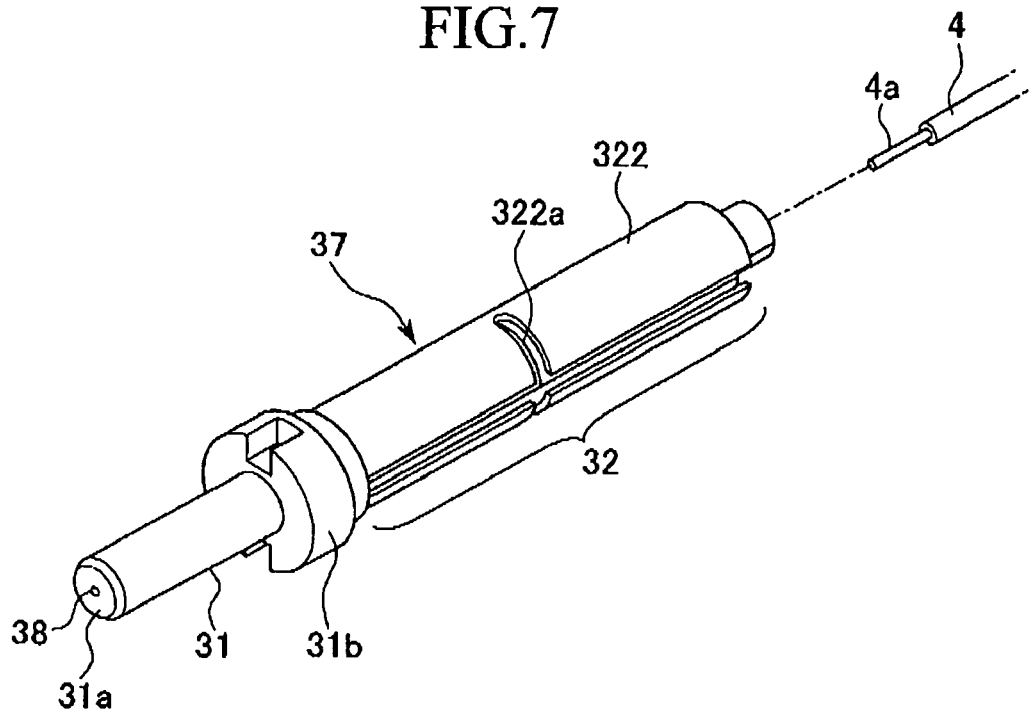
FIG. 7 is a perspective view showing the clamping portion equipped ferule which is housed in the optical connector shown in FIG. 5.
Figure 8:
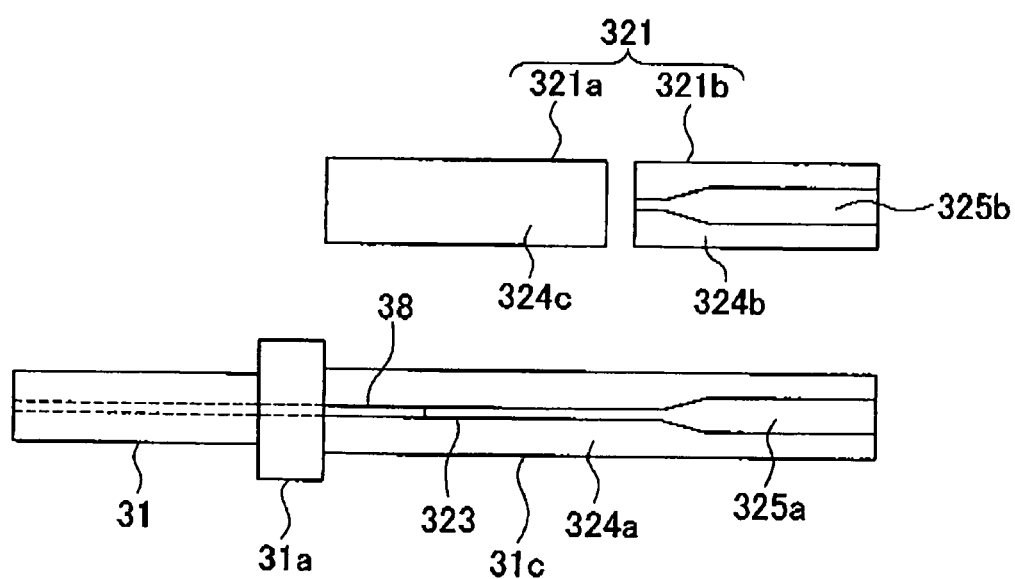
FIG. 8 is a drawing showing abutment surfaces of each of the elements that form the clamping portion of the clamping portion equipped ferule shown in FIG. 7.

FIG. 7 is a perspective view showing the clamp equipped ferule 37, and FIG. 8 is a drawing showing abutment surfaces of the two lid elements 321a and 321b and the base side element (extension portion 31c) that form the clamping portion of the clamp equipped ferule 37.

As shown in FIG. 6 to FIG. 8, the clamping portion 32 is formed by accommodating the extension portion 31c that extends from the flange portion 31b of the ferule 31 and the lid elements 321a and 321b that are disposed on an abutment surface 324a of the extension portion 31c inside of the sleeve shaped spring 322 having a C shaped cross-section (C-shaped spring).

The extension portion 31c forms one of half split elements (hereinafter sometimes referred to as an element 31a) that form the clamping portion 32, and the two lid elements 321a and 321b form the other (element 321) of the half split elements that forms that forms the clamping portion 32. The clamping portion 32 has a structure in which an optical fiber is clamped between the pair of half split elements 31a and 321. The two lid elements 321a and 321b are arranged along the optical connector 3 (right to left in the FIG. 6) such that one (the element 321a) is closer to the ferule 31 side than the other (the element 321b).

The spring 322 is configured such that elasticity of the spring 322 acts separately on the two lid elements 321a and 321b by the slit 322 formed in the spring 322 in proximity to the border between the two lid elements 321a and 321b. Accordingly, one set consisting of the lid element 31a and the extension portion 31c and the other set consisting of lid element 321b and the extension portion 31c each can function as an independent clamping portion.

In the connector holder equipped optical connector 1 according to the present invention, the insertion members 21 of the connector holder 2 (refer to FIG. 3 and FIG. 4) are wedged between the pair of elements 31c and 321 (that is, between the abutment surface opposite to the element 321 of the extension portion 31c and the abutment surface opposite to the element 31c of the lid elements 321 and 322) via the insertion openings 34a and 34b of the stop ring from outside the optical connector, and the pair of elements 31c and 321 are slightly pushed open due to resisting the elasticity of the spring 322.

In addition, the two insertion openings 34a and 34b of the stop ring 34 open at the position that corresponds to the two clamping portions that correspond to the two lid side elements 321, and two insertion members 21 project from a bottom wall 22e of a holder body 22 into the accommodation recess 22a are wedged between the element 31c and the element 321a through the two insertion openings 34a and 34b, respectively.

The distal end of the insertion member 21 in the present embodiment is formed so as to have a curved shape, as shown in FIG. 3 and FIG. 4. However, the distal end shape of the insertion member 21 is not limited to this. Other shapes may be employed as long as a state in which the pair of elements 31c and 321 are slightly pushed open due to resisting the elasticity of the spring 322 by wedging the insertion members 21 between the pair of elements 31c and 321 can be maintained. Other examples of shapes for the insertion member 21 will be separately explained with reference to FIGS. 10A and 10B.

Note that a variety of shapes can be used for the spring 322, such as one having a U-shape in cross-section.

Next, the connector holder 2 will be explained with reference to FIG. 1 to FIG. 4.

As shown in FIG. 1 to FIG. 4, the connector holder 2 includes a holder body 22 that is attached outside the optical connector 3; a ring-shaped insertion member operating portion 23 that projects beyond the holder body 22; and, in the insertion member operating portion 23, insertion members 21 that project from the movable end portion 24, which is an end portion on the side opposite to the holder body 22, towards the holder body.

Here, the connector holder 2 is an integral element made of a synthetic resin; however, in the present invention, this is not limiting, and the connector holder 2 can be formed by plural elements.

The holder body 22 is formed having a U-shape in cross-section, and the inside thereof forms a groove-shaped accommodation recess 22a that accommodates the optical connector 3 so that it can be extracted. That is, the holder body 22 includes a bottom wall 22e, and side walls 22b and 22c erected on this bottom wall 22e and disposed on both sides thereof via the accommodation recess 22a.

Note that in the connector holder equipped optical connector 1, the connector holder 2 accommodates the optical connector 3 in the accommodation recess 22a, and furthermore, by wedging the insertion members 21 between the elements 31c and 321 of the clamping portion 32, it becomes attached to the optical connector 3 to form a portion of the connector holder equipped optical connector 1. However, the connector holder 2 can also serve as an independent tool, for example, in the operation of releasing the optical connector already attached to the distal end of an optical fiber from the optical fiber.

Note that the bottom wall 22e of the holder body 22 is divided into two parts by the slit 28, and the insertion members 21 project into the accommodation recess 22a through the slit 28. However, the structure (insertion member window) for allowing the insertion members 21 to project into the accommodation recess 22a from the insertion member operating portion 23 is not limited to the slit 28 that divides the bottom wall 22e into two parts. For example, a small hole may be bored into the bottom wall 22e. The insertion members 21 are disposed so as to pass through the insertion member window, but the insertion member window does not hinder the movement of the insertion members 21 caused by the deformation of the insertion member operating portion 23.

Concretely, the insertion member operating portion 23 is formed by the movable end portion 24 and a pair of side portions 25a and 25b (hereinafter referred to as joining wall portions) that join between the movable end portion 24 and the holder body 22. The joining wall portions 25a and 25b have an L-shape, and the inner corners of the curved part of the L-shape of each of the joining wall portions 25a and 25b face opposite each other. That is, the curved portions connects the holder body 22 to the movable end portion 24 in such a manner that the curved portions project outwardly at positions between the holder body 22 and the movable end portion 24.

The pair of joining wall portions 25a and 25b project from the bottom wall 22e of the holder body 22 in a direction opposite to that of the side walls 22b and 22c, and the distal end of this projection joins with the movable end portion 24. The movable end portion 24 has a plate shape, and the distal end of the projection from the holder body 22 of the joining wall portions 25a and 25b joins with both sides that are opposite to the movable end portion 24. The movable end portion 24 is supported by the pair of joining wall portions 25a and 25b so as to be substantially parallel to the plate-shaped bottom wall 22e of the holder body 22.

The insertion member operating portion 23 in the present embodiment is formed so as to be right-left symmetrical, as shown in FIG. 3 and FIG. 4. At the point where the linear movement of the insertion members 21 is stably maintained, it is preferable that both side portions (joining wall portions 25a and 25b) of the insertion member operating portion 23 be symmetrical while having the insertion members 21 therebetween.

The insertion member operating portion 23 and the bottom wall 22e of the holder body 22 form an operating structure having a substantially hexagonal sleeve-shaped in cross-section. Here, the insertion member operating portion 23 specifically has a substantially C-shape projecting from the holder body 22. However, in the present invention, "ring-shaped", which denotes the shape of the insertion member operating portion 23 may also denote a general shape that expands from the holder body 22, such as a circular shape, an elliptical shape, a rhombus shape, a C-shape. In addition, the operating structure formed by the insertion member operating portion 23 and the holder body 22 (specifically, the bottom wall 22e) also has a "ring shape", such as a circle, ellipse, rhombus, or C-shape.

However, another possible structure for the insertion member operating portion (and the operating structure) is one in which side portions (the joining wall portions in the present embodiment) that join between the holder body 22 and the movable end portion 24 are formed between the holder body 22 and the movable end portion 24 so as to project outwardly, and by making both sides (joining wall portions) approach each other due to the pressing force (lateral pressure) from both opposing sides, the distance between the holder body 22 and the movable end portion 24 increases, and the insertion members 21 move in the direction in which the dimension of the projection towards the accommodation recess 22a (in other words, the dimension of the projection from the stopper wall) decreases (or the projection is eliminated).

On this point, for example, the insertion member operating portion can have a long narrow structure or the like that extends along the insertion members 21, and it is not always necessary, as shown in the examples in the figures that the insertion member operating portion have a structure in which both side portions that join between the holder body 22 (more specifically, the bottom wall 22e that functions as stopper wall) and the movable end portion 24 greatly overhangs on both sides of the insertion members 21.

In addition, any stopper wall can be used in which, when the insertion members 21 is moved by applying lateral pressure from both sides opposite to the insertion member operating portion to make both side portions (joining wall portions) approach each other, the movement of the optical connector 3 (specifically, the clamping portion 32) trailing the insertion members 21 is restricted, and thereby release of the insertion members 21 from between the elements of the clamping portion 32 can be realized. The bottom wall 22e in the example in the figure is not limiting, and for example, may be a pin-shaped projection.

The insertion member operating portion 23 will be concretely explained.

The insertion member operating portion 23 has a structure in which the four joining plate portions 26a to 26d and the movable end portion 24 join in one series. Among the four connecting plate portions 26a to 26d, the connecting plates denoted by the reference symbols 26a and 26b form one joining wall portion 25a and the connecting plates denoted by the reference symbols 26c and 26d form the other joining wall portion 25b. Among the connecting plate portions 26a to 26d that join in a row and the movable end portion 24, which joins in series with the connecting plates 26a and 26d positioned at both ends join with both opposite sides of the holder body 22 (specifically, the bottom wall 22e), and thereby a sleeve that has a substantially hexagonal shape in cross-section is formed by the insertion member operating portion 23 and the bottom wall 22e.

A thin walled portion 27 that deforms easily due to being thin in comparison to the connecting plates 26a to 26d and the movable end portion 24 joins the joining plates 26a and 26d and the holder body 22 (specifically, the bottom wall 22e), between the connecting plate 26a and the connecting plate 26d, and between the connecting plates 26b and 26c and the movable end portion 24, and this thin walled portion 27 functions like a hinge (functions as a hinge) due to the deformation. Thereby, the relative angle between the connecting plates 26a and 26d and the holder body 22 (specifically, the bottom wall 22e), between the connecting plate 26a and the connecting plate 26b, between the connecting plate 26c and the connecting plate 26d, and between the connecting plates 26b and 26c and the movable end portion 25 becomes changeable.

As described above, in the connector holder equipped optical connector 1, the insertion members 21 of the connector holder 2 are inserted between the extension portion 31c and the lid side elements 321 and 322, and the extension portion 31c and the lid side elements 321 and 322 are slightly pushed apart due to resisting the elasticity of the spring 322. The connector holder 2 also functions as the release mechanism according to the present invention. In this state, it is possible to insert and release the optical fiber 4 (second optical fiber) between the pair of elements 31c and 321 of the clamping portion 32 from the back end side of the optical connector 3.

Here, as illustrated in FIG. 7, a single core type optical fiber core wire is used as the optical fiber 4. The projecting portion 38a, which is the part of the optical fiber 38 (the first optical fiber; also referred to below as the optical fiber on the ferule side) inserted and fastened in the ferule 31 that projects from the back end of the ferule 31, is inserted between the pair of elements 31c and 321 of the clamping portion 32, and when the optical fiber 4 is inserted between the pair of elements 31c and 321 from the back end side of the clamping portion 32, it is possible to abut connect it to the optical fiber 38 (more specifically, the projecting portion 38a).

Note that the optical fiber is not limited to an optical fiber core wire, but, for example, an optical fiber wire, optical fiber cord or the like may be used.

In addition, the optical fiber in the present embodiment is a silicon glass optical fiber.

Specifically, to connect the optical fibers 4 and 38 together in the clamping portion 32, the distal end, at which the bare optical fiber 4a is exposed, is inserted from the back end side of the clamping portion 32 into the grooves 325a and 325b formed in the abutment surfaces of either one or both of the pair of elements 31c and 321 of the clamping portion 32 (here, formed on both the abutment surface 324a of the element 31c and the abutment surface 324b of the element 321b; refer to FIGS. 6, 8, and the like). These grooves 325a and 325b are formed in the pair of elements 31c and 321 at locations exactly opposing each other, accommodate a covered portion of the optical fiber 4, and have a shape that enables secure clamping of the covered portion of the optical fiber 4 due to the elasticity (clamping force) of the spring 322 when the insertion members 21 are released from the clamping portion 32.

The grooves 325a and 325b are formed so as to extend from the opening portion 325c that opens in the back end side of the clamping portion 32 towards the ferule 31, and the end portion on the ferule 31 side communicates with the aligning groove 323 formed on the abutment surface of one or both of the pair of elements 31c and 321 of the clamping portion 32 (here, only the abutment surface 324a of the element 31c). In the aligning groove 323, the optical fiber 38 on the ferule side (here, the bare optical fiber) is accommodated and precisely positioned and aligned.

When the optical fiber 4 that has been pushed into the grooves 325a and 325b is pushed further towards the ferule 31 side, the bare optical fiber 4a at the distal end of the optical fiber 4 can be inserted into the aligning groove 323 from the grooves 325a and 325b, and in the aligning groove 323, the optical fiber 38 on the ferule side (specifically, the distal end of the projection 38a) can be abutment connected in a state of precision positioning and alignment due to the alignment precision of the alignment groove 323. Here, this aligning groove is a V-groove, but for example, any type of structure such as a U-groove, a round groove (a groove with a semi-circular cross-section) or the like can be used.

When the abutment connection between optical fibers 4 and 38 has been completed, the connector holder 2 is released from the optical connector 3. In this release operation, the optical connector 3 can be extracted from the accommodation recess 22a between both the side walls 22b and 22c of the connector holder 2.

Specifically, when a pushing force (lateral pressure) acts from both opposing sides on the part positioned between the movable end portion 24 and the holder body 22 and the insertion member operating portion 23 approaches the area between the joining wall portions 25a and 25b on both sides, due to the deformation as a whole, the distance between the movable end portion 24 and the holder body 22 increases (refer to FIG. 4). Thereby, because the insertion members 21 move in the direction in which amount of projection into the accommodation recess 22a from the bottom wall 22e is decreased (or the projection from the bottom wall 22e is eliminated), the insertion members 21 that are inserted between the elements can be extracted. At this time, the bottom wall 22e functions as a stopper wall that regulates optical connector 3 moving together with the insertion members 21, and thus the extraction of the insertion members 21 from between the elements can be realized smoothly.

Here, the joining wall portions 25a and 25b on both sides are symmetrically formed due to the space (inside space S) on the inside of the insertion member operating portion 23, and the four connecting plate portions 26a to 26d and the movable end portion 24 are shifted due to the function of the plurality of thin walled portions 27 (functioning as hinge parts due to the deformation). From the state in which the joining wall portions 25a and 25b on both sides have deformed equally (from the state of the L-shaped curvature gradually to the straight line, as shown in FIG. 4), the insertion members 21 move linearly with respect to the clamping portion 32 of the optical connector 3, which is supported by the holder body 22, to be extracted from between the elements 31c and 321. Thus, there is no concern that the elements 31c and 321 of the clamping portion 32 will be damaged due to the incline of the insertion members 21 during extraction.

The movement of the insertion members 21 with respect to the clamping portion 32 is a linear movement along the extension of the border between the pair of elements 31c and 321. In addition, in the optical connector 3, because the insertion members 21 are wedged between the elements 31c and 321, the insertion member insertion recess 325d formed on the side portions of the elements 31c and 321 face the surface opposite to the movable end portion 24 of the insertion member operating portion 23. Because the holder body 22 is firmly supported so that position misalignment will not occur, while extracting the insertion members 21, the inconvenience that the insertion members 21 apply a deformation pressure or the like to the pair of elements 31c and 321 occurs with difficulty. Furthermore, because the inconvenience that the needless increase in the extraction resistance of the insertion members 21 from the pair of elements 31c and 321 occurs with difficulty, the extraction can be carried out with a small force.

Note that any type of structure can be used for the insertion member operating portion 23, but as described above, the insertion member operating portion 23 preferably has a structure wherein a pressing force (lateral pressure) acts from both opposite sides on the part located between the movable end portion 24 and the holder body 22, and when the insertion members 21 approach the joining wall portions 25a and 25b that are on both sides, the joining wall portions 25a and 25b on both sides deform equally, the insertion members 21 moves linearly with respect to the clamping portion 32 of the optical connector 3 supported by the holder body 22, and the insertion members 21 can be extracted from between the elements 31c and 321.

In addition, because the amount of movement of the movable end portion 24 with respect to the holder body 22 is smaller than the amount of change in the distance between the joining wall portions 25a and 25b due to approach of the joining wall portions 25a and 25b (more specifically, for example, the amount of change in the distance between the thin walled portions 27 that join the joining plates in the joining wall portions 25a and 25b), the insertion member operating portion 23 functions as a force amplifying mechanism that converts the lateral pressure into the extraction force for extracting the insertion members 21 from the apace between the elements.

When the release operation has completed, the insertion members 21 of the connector holder 2 are extracted from between the pair of elements 31c and 321, and the optical fibers 4 and 38 are clamped and fastened between the pair of elements 31c and 321 due to the elasticity of the spring 322 so as to be inserted therebetween. Thus, the connection state between the optical fibers 4 and 38 is maintained. Thereby, the optical connector 3 is attached to the distal end of the optical fiber 4.

According to the invention of the present application, the connector holder equipped optical connector 1 can attach the optical connector 3 to the distal end of the optical fiber 4 without using a conventional dedicated tool. In addition, the connector holder 2 has an extremely simple structure, and furthermore, can be manufactured inexpensively. Thus, in comparison to using a dedicated tool, a significant cost reduction can be realized. Furthermore, after the connector holder 2 has been attached to the optical connector 3 and the optical fiber 4 has been inserted into the clamping portion 32, simply by releasing the connector holder 2 from the optical connector 3, it is possible to realize the attachment of the of the optical connector 3 to the distal end of the optical fiber 4. Thus, the operation in which precise positioning and support are carried out so that the optical connector is inserted into the holder portion, which is required in the case in which a conventional dedicated tool is used, becomes unnecessary, and the attachment operation becomes extremely simple.

The thin walled portion 27 used as a hinge part elastically deforms due to the lateral pressure applied by the insertion member operating portion 23, and thus when the lateral pressure is released and the optical connector is extracted from the holder body, due to the elasticity of the thin walled portion 27, the shape prior to the application of lateral pressure to the insertion member operating portion 23, that is the shape shown in the examples in FIG. 1 to FIG. 3, is restored. Therefore, use for the attachment of the optical connector to the holder body again and the attachment of the connector holder equipped optical connector is also easy.

Note that the concrete structure of the connector holder and the connector holder equipped optical connector according to the present invention are not limited by the embodiment described above, and may have various modifications.

The hinge part is not limited to the thin walled portion 27 described above, but for example, a structure that uses a hinge or the like can also be used. As a insertion member operating portion, in addition to the structure in which a part of the connector holder equipped optical connector 1 is integrally formed by resin along with the holder body illustrated in the embodiment described above, a structure can be used in which, for example, a plurality of members that include a plurality of plate shaped members and a pin that pivotally fits these plate shaped members together are attached in a ring shape.

Figure 9:
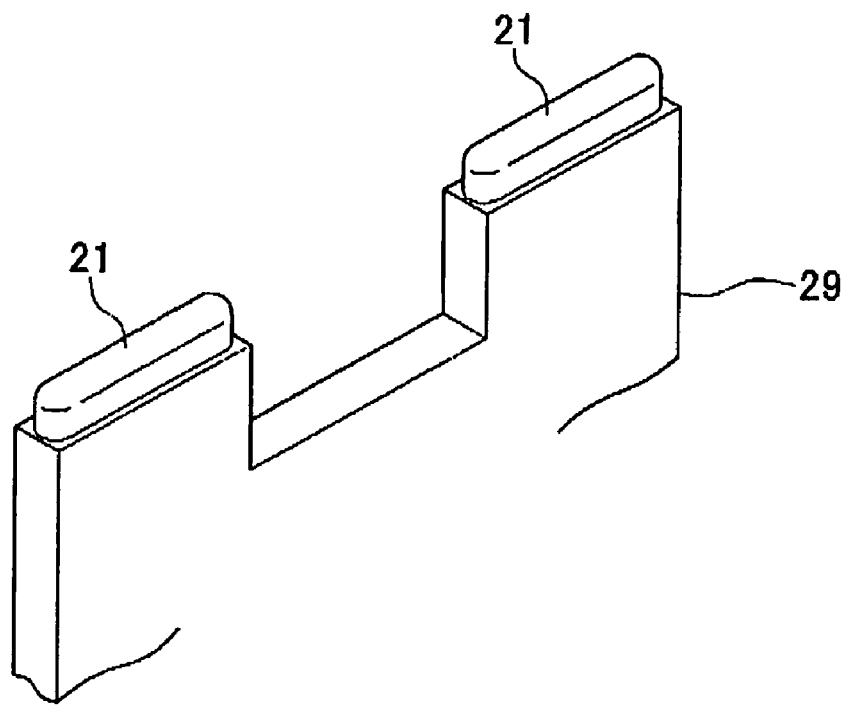
FIG. 9 is a perspective view showing another embodiment of the insertion members.

The number of the insertion members erected on the movable end portion 24 is not limited to the two illustrated in FIG. 2 or the like, but three or more can be used. In addition, as illustrated in FIG. 9, a structure is used in which the plurality of insertion members are formed on the distal end of the projection from the movable end portion 24 of the plate shaped insertion part member body 29 erected from the movable end portion 24. In the connector holder illustrated in the embodiment described above, the position of the distal ends of the two insertion members 21 are aligned together and the insertion depth with respect to the clamping portion of the optical connector supported by the holder body is also the same. However, in the present invention this is not limiting, and a structure can be used in which the projection dimensions of the plurality of insertion members from the movable end portion differ.

In addition, the plurality of insertion members is structured so that the thickness of the parts (distal ends) inserted into the clamping portion of the optical connector are uniformly aligned, but this is not limiting. A structure can be used in which the thickness differs corresponding to the amount of opening of the elements when inserted into the element. The amount of opening when an insertion member is inserted into an element corresponds to the thickness of the optical fiber inserted between the elements, and is determined such that the insertion of the optical fiber is possible.

For example, the thickness of the optical fiber is different at the bare optical fiber 4a exposed by removing the cover of the distal end of the optical fiber 4 illustrated in the embodiment described above and a portion where the bare optical fiber 4a is not exposed (the covered portion), and thus in the plurality of insertion members, the thickness of the part (distal end) that is inserted into the clamping portion of the optical connector differs corresponding to the thickness of the optical fiber, and thus it is possible to determine the opening of the element that corresponds to differences in the thickness of parts of an optical fiber.

In addition, it is possible for there to be only one insertion member. For example, the part (distal end) inserted into the clamping portion of the optical connector can use one plate shaped insertion member that extends along the alignment axis of the aligning groove.

Figure 10A:
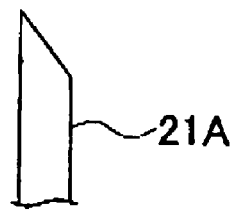
FIGS. 10A and 10B are side views showing another embodiment of distal ends of the insertion members.
Figure 10B:
Figure 11:
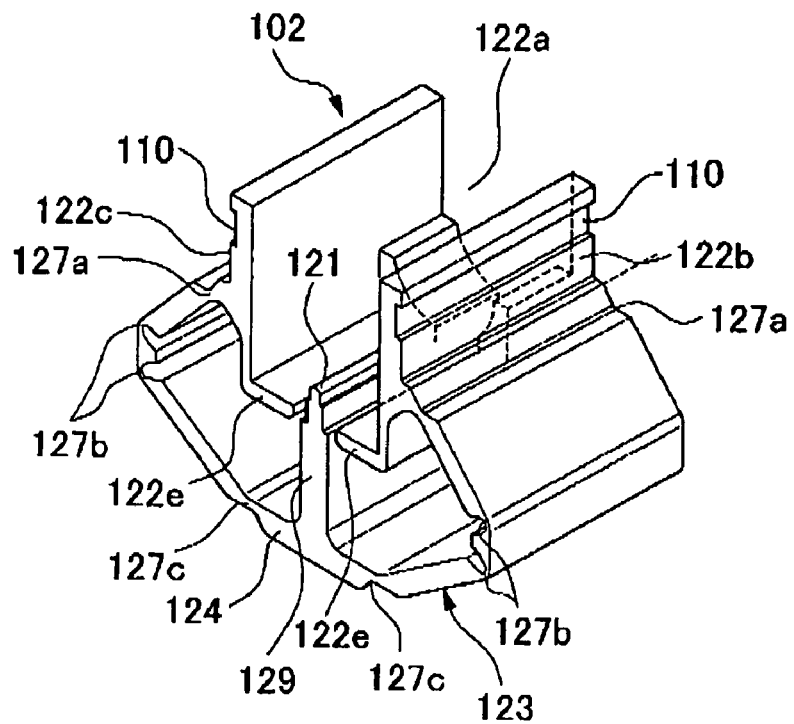
FIG. 11 is a perspective view showing another embodiment of the connector holder.

As illustrated in FIG. 3 and FIG. 4, the concrete shapes of the distal end of an insertion member are shapes that have curved surfaces (in order to make the element difficult to damage). However, as illustrated in FIG. 10A and FIG. 10B, the distal end can have various types of shape, such as a pointed shape, a shape in which a sloped surface symmetrical from the distal end on both sides is formed, or a shape in which a slope surface from the distal end having only one side is formed can be used.

In addition, an optical connector 3 (optical connector plug) applied to the present invention is not limited to a connector for a single core type optical fiber core wire, but a connector for a multiple-core type optical fiber core wire can also be used. In the case of using a connector for a multiple-core type optical fiber core wire, a structure in which there is a plurality of aligning grooves formed on the elements of the clamping portion is employed.

Next, another embodiment of the connector holder 2 and a retainer for supporting the optical connector inside the connector holder will be explained with reference to FIGS. 11 through 15.

Figure 12:
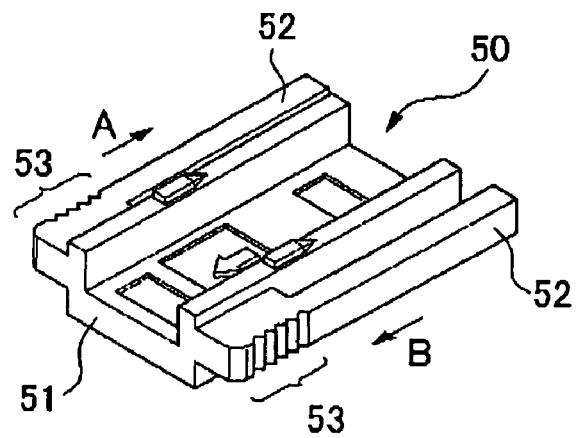
FIG. 12 is a perspective view showing a retainer used for holding the optical connector in the connector holder.
Figure 13:
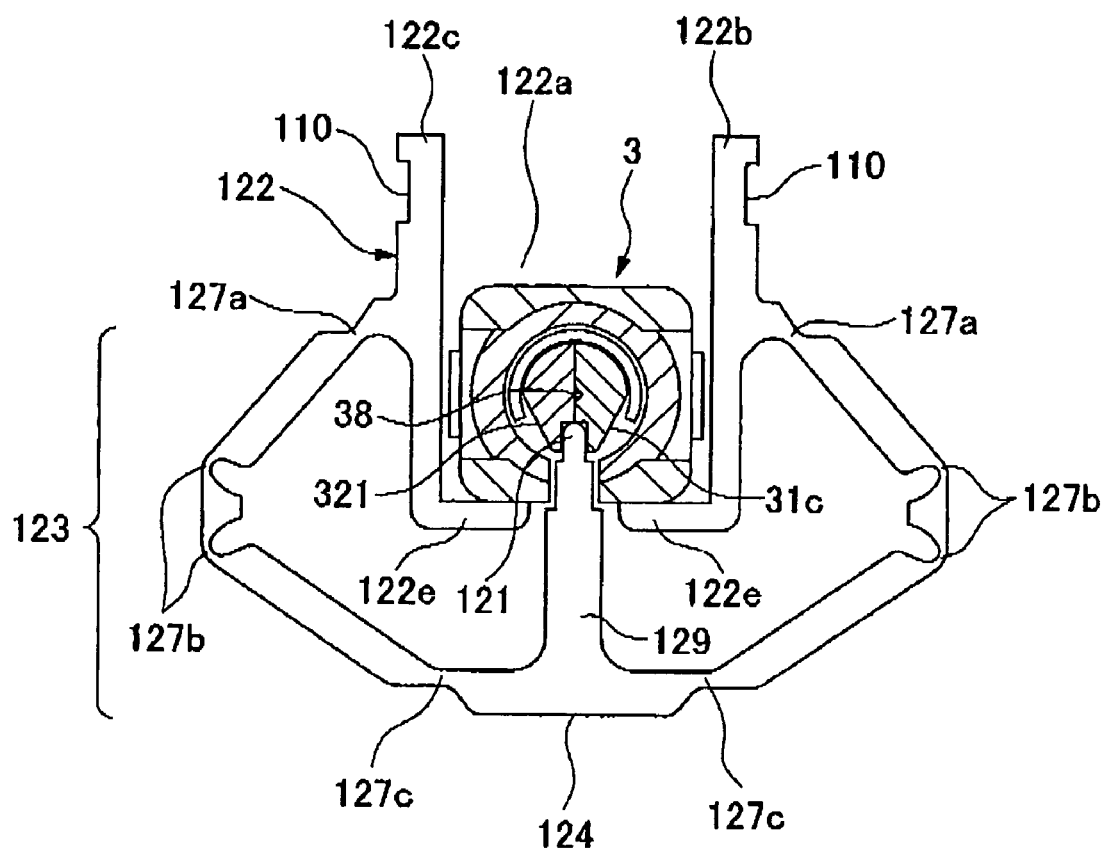
FIG. 13 is a front view showing a state in which the optical connector is accommodated in the connector holder shown in FIG. 11 and the insertion members are wedged into a space between a pair of elements.
Figure 14:
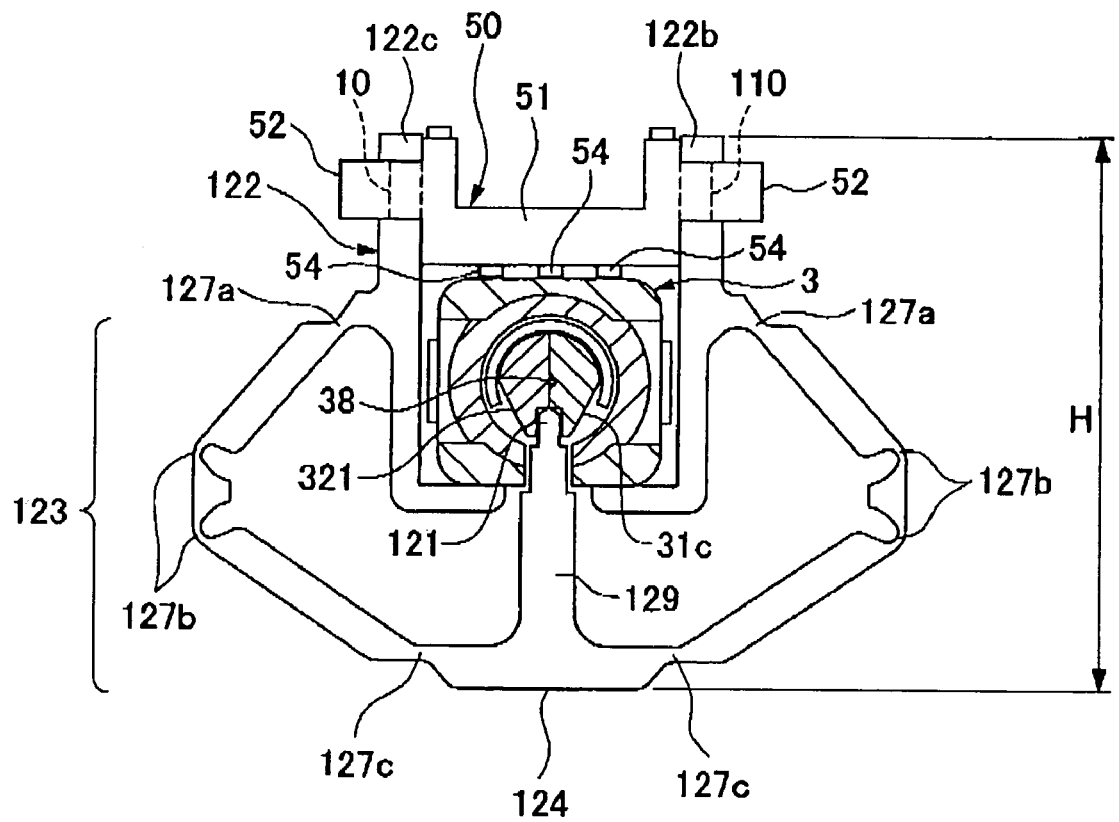
FIG. 14 is a front view showing a state in which the retainer shown in FIG. 12 is attached to the connector holder shown in FIG. 11.
Figure 15:
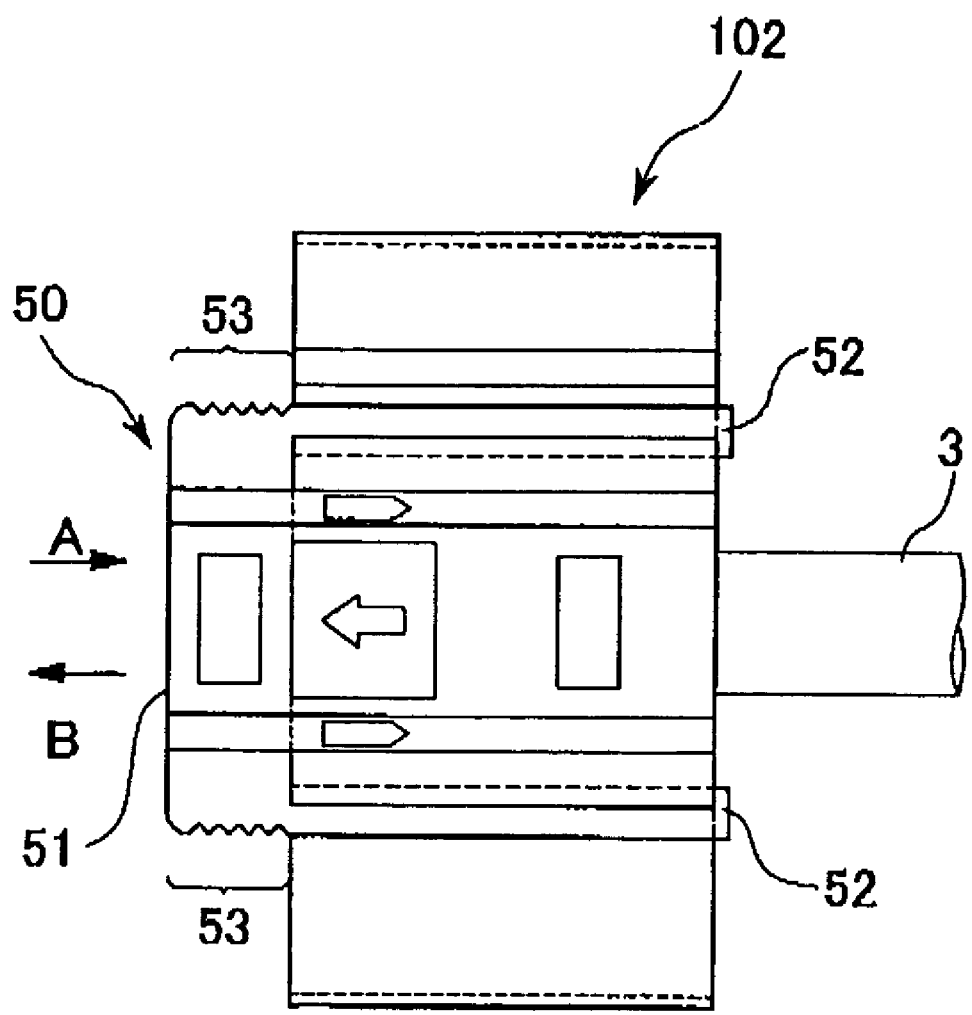
FIG. 15 is a front view showing a state in which the retainer shown in FIG. 12 is attached to the connector holder shown in FIG. 11.

The connector holder 102 shown in FIGS. 11 and 13 to 15 differs from the connector holder 2 described above in that the bottom wall 122e is offset in the vertical direction in the figure with respect to the thin walled portion 127a that approaches the bottom wall 122e, that is, the point that the insertion member operating portion 123 is a polygonal shape having a concave part when seen from the direction extending along the recess 122a that accommodates the optical connector 3, and the point that an engagement groove 110 that can engage with the arm 52 of the retainer 50 shown in FIGS. 12, 14, and 15 is formed.

Like the connector holder 2 shown in FIG. 2, the connector holder 102 includes a holder body 122, an insertion member operating portion 123, and a recess 122a that accommodates the optical connector 3. The insertion member operating portion 123 includes thin walled portions 127a, 127b, and 127c, and thereby is easily deformable. The bottom wall 122e, which acts as the bottom wall of the recess 122a, is offset in the vertical direction in the figure with respect to the thin walled portion 127a that approaches the bottom wall 122e and is offset in the direction that approaches to the movable end portion 124.

Accompanying this, in the insertion member body 129 that projects from the movable end portion 125 in the insertion member operating portion 123, the length in the projection direction with respect to the insertion member operating portion 29 of the connector holder 2 is made short. The holder body 122 includes a pair of side walls 122b and 122c, and an engagement groove 110 that extends parallel (the direction perpendicular to the plane of FIG. 13) to the axis of the connector holder 102 is formed on the outside surface of each of the side walls 122b and 122c.

The retainer 50 shown in FIGS. 12, 14, and 15 is provided in order to support the optical connector 3 in the recess 122a of the connector holder 102 during delivery. The retainer 50 includes a retainer body 51 having a substantially rectangular shape in plan view and a pair of arms 52 that connect to one end of the lock lever body 51 and extend towards the other edge of the retainer body 51 in a cantilever state. The cross-sectional shape of each of the arms 52 perpendicular to the direction of the extension is rectangular. In addition, a grip part 53 having the shape of triangular waves in a planar view are formed in each of the arms 52, outside the part that connects to the retainer body 51. As shown in FIG. 14, on the lower surface of the retainer 51, a plurality (three in the illustrated embodiment) of projections 54 are formed.

The external dimensions of the arms 52 of the retainer 50 and the dimensions of the engagement groove 110 of the connector holder 102 are determined such that when the elastic deformation of each is used the connector holder 102 and the retainer 50 do not readily release due to vibration. The material of the retainer 105 is preferably a synthetic resin identical to that of the connector holder 102, but this is not limiting.

Next, the operation from the assembly steps at the production factory up to the optical connection of the pair of optical fibers will be explained with reference to FIG. 13 and FIG. 14. In FIGS. 13 and 14, the optical connector 3 is identical to that shown in FIG. 3 and the like, and thus the detailed explanation of the structure thereof will be omitted.

In the production factory, before shipping, the optical connector 3 is disposed inside the recess 122a of the connector holder 102, then the insertion members 12 are inserted through the insertion opening of the stop ring 34 from outside the optical connector 3 the movable end portion 124 is pushed towards the optical connector 3 while holding the optical connector 3, the insertion members 121 are wedged between the pair of elements 31c and 321, and thereby the state shown in FIG. 13 is realized. Due to this operation, the lower end portions of the elements 31c and 321 become slightly separated while resisting the elasticity of the spring 322 (this gap is not shown in FIG. 13 because it is very small), a gap opens in the vicinity of the optical fiber 38, to release the optical fiber 38 that is being held.

Next, the retainer 50 is slid along the direction of arrow A shown in FIGS. 12 and 15 while the gripping part 53 is gripped, and the pair of arms 52 are engaged in the engagement groove 110 of the connector holder 102. At this time, due to the projection 54 that is formed on the lower surface of the retainer 50, the upper surface of the optical connector 3 is slightly pressed, and the optical connector 3 is held in the recess 122a so as to have no play. Therefore, during the delivery after being shipped from the factory, the optical connector 3 is reliably held in the recess 122a.

After delivery, at the connection site, the optical fiber 38 and the other optical fiber (not illustrated) to be optically connected are disposed in the groove formed in the element 31c, and the ends of the optical fibers are abutted to each other.

Next, a pressing force (lateral force) is applied in opposite directions to the part positioned between the movable end portion 124 and the holder body 122 in the insertion member operating portion 123, that is, the part in proximity to the thin walled portions 127b, the insertion member body 129 is moved downward in the figure, and the insertion members 121 are extracted from between the elements 31c and 321. As a result, the elements 31c and 321 are brought into contact due to the restoring force of the spring 322, and the optical fiber 38 and the optical fiber not illustrated are held in an optically connected state between the elements 31c and 321.

Next, in an operation that is the reverse of that in the production factory, the retainer 50 is slid in the direction of arrow B shown in FIGS. 12 and 15 while the part 53 is gripped, the arm 52 are released from the engagement grooves 110 of the connector holder 102, and the optical connector 3 is removed from the recess 122a of the connector holder 102.

The retainer 50 can be recovered and reused because it is only slightly elastically deformed during use.

According to the connector holder 102 and the retainer 50 having the structure described above, when being conveyed from the production factory to the connection site in the field, the optical connector 3 can be reliably held in the recess 122a.

In addition, because the bottom wall 122e is offset in the vertical direction in the figure with respect to the thin walled portions 127a that approach the bottom wall 122e, assuming that the same type of optical connector 3 is being held, in comparison to the connector holder 2 in the embodiment described above, it is possible to keep the overall height H (shown in FIG. 14) of the connector holder 102 low, and thus the space use efficiency during delivery can be improved.

Note that in the above description, the optical connector 3 is held by pressing the upper surface of the optical connector 3 by the projection 54 of the retainer 50, but it is possible to use a structure in which a gap is provided between the upper surface of the optical connector 3 and the lower surface of the retainer 50. In this case, the dimension of the gap is determined such that the insertion members 121 are not extracted from the gap between the elements 31c 321 even when the optical connector 3 is moved vertically in the recess 122a.

Figure 16:
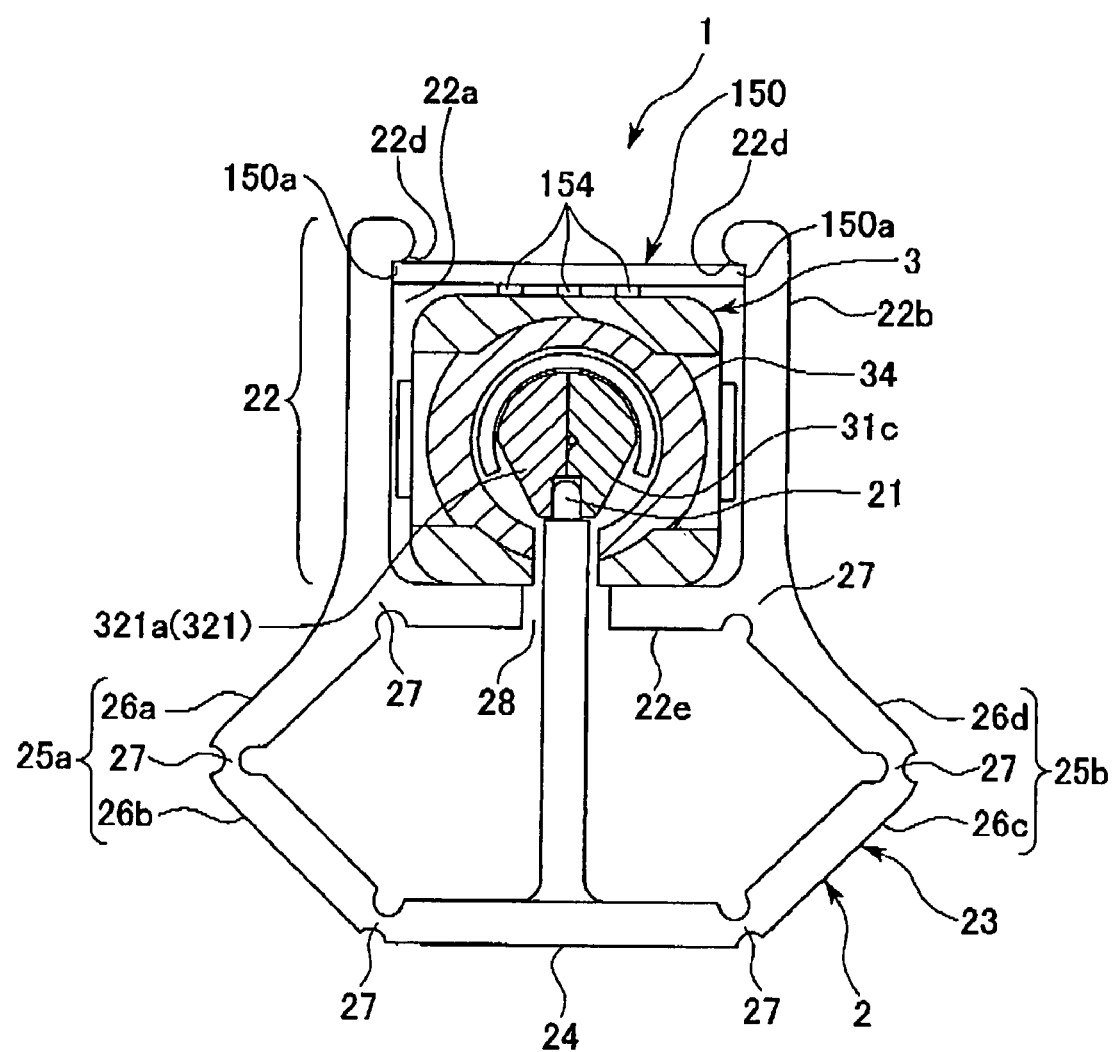
FIG. 16 is a front view showing a state in which the retainer is attached to the connector holders shown in FIG. 1 to FIG. 3.

FIG. 16 shows an example in which a retainer 150 having a shape that differs from that of the retainer 50 in the embodiment described above in order to hold the optical connector 3 in the connector holder 2 shown in FIG. 3 more reliably in the recess 22a.

A convexity 22d that projects towards the recess 22a and extends parallel (the direction perpendicular to the plane of FIG. 15) to the axis of the connector holder 2 is formed on the respective upper end portions of the pair of side walls 22b and 22c of the holder body 22: The retainer 150 is a substantially flat plate shaped member, and like the retainer 50, on the lower surface a plurality (three in the embodiment in the figures) of projections 154 are formed.

The retainer 150 is slid and inserted into the recess 22a along the axial direction of the connector holder 2 after the optical connector 3 is disposed in the recess 22a and the insertion members 21 is inserted between the elements 31c and 321 while the projection 154 is brought into contact with the upper surface of the optical connector 3. The thickness (height) of the retainer 150 is determined such that, after insertion, the upper corner portion 150a of the retainer 150 abuts the convexity 22d and the projection 154 abuts the upper surface of the optical connector 3, and thereby, the optical connector 3 is held in the recess 22a due to the shape of the retainer 150 elastically deforming slightly.

In addition, the width (the length in the horizontal direction in FIG. 15) of the retainer 150 is set so as to match the width of the recess 22a substantially but not interfere with the sliding and insertion of the retainer 150 into the recess 22a. The material of the retainer 150 is preferably a synthetic resin identical to that of the connector holder 2, but is not limited thereby.

Next another embodiment of the connector holder will be explained with reference to FIG. 17.

Figure 17:
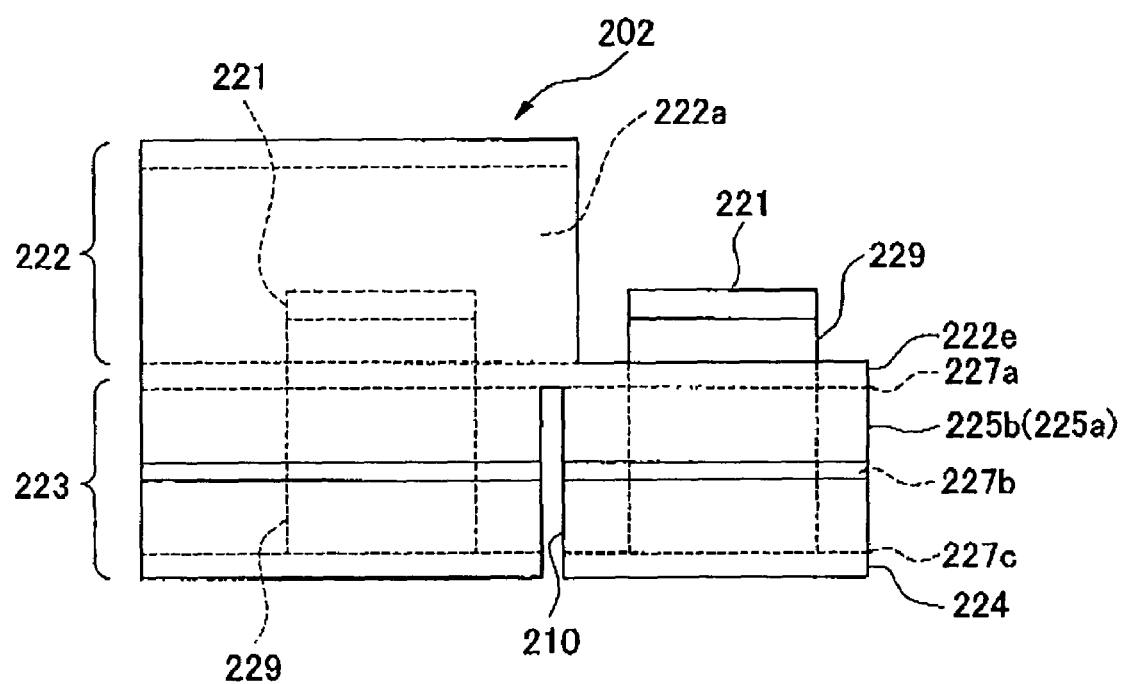
FIG. 17 is a side view showing yet another embodiment of a connector holder.

The connector holder 202 shown in FIG. 17 resembles the connector holder 2 shown in FIGS. 1 to 3. However, the connector holder 202 differs from the connector holder 2 in that a slit 210 is formed in a pair of joining wall portions 225a and 225b and a movable end portion 224 included in the insertion member operating portion 223 at a position between the two insertion member bodies 229.

The slit 210 is formed so as to be continuous from the movable end portion 224 to the thin walled portion 227a through the thin walled portion 227b of each of the joining wall portions 225a and 227b. Due to this structure, one set consisting of the joining wall portions 225a and 227b and the insertion member body 229 can shift independently from the other set.

Therefore, in the case in which the optical connector 3 is accommodated in the recess 222a and each of the inserted insertion members 221 are extracted from between the elements 31c and 321, while the one insertion member 221 is held in the state of penetration between the elements 31c and 321, it is possible to extract the other insertion member 221 from between the elements 31c and 321. In this manner, because it is possible to prevent unnecessary vibration of the elements 31c and 321 due to one of the insertion members 221, there is the advantage of the positioning precision of the optical fiber.

In the present invention, in the "optical connector" denotes optical parts generally that use an abutment connection between optical fibers (this is not necessarily limited to a connection in which the end surfaces of the optical fibers are brought together, and includes the optical fibers being optically connected together in opposition to each other via a small gap), but is not necessarily limited to using a ferule. In addition, the optical connector according to the present invention has a clamping portion that clamps the optical fibers that are abutment connected and maintains the connected state, and optical connectors that have such a clamping portion are referred to as "optical connectors" in the present invention.

The present invention has as an object carrying out simply and quickly the attachment of an optical connector to the distal end of an optical fiber, and can be applicable to any type of optical connectors. In addition, the present invention can be used in an optical connector that is included in an apparatus or mechanism.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical fiber connecting tool for an optical connector which houses a ferule, a first optical fiber mounted in the ferule and extending from a back end of the ferule, and a second optical fiber abutted and connected to the first optical fiber, the optical connector comprising a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring, the optical fiber connecting tool comprising:
- an insertion member for maintaining a state in which the second optical fiber is insertable into and removable from the space between the half split elements by being wedged into the space from outside of the clamping portion so as to expand the space between the half split elements;
- an insertion member operating portion, having a ring shape, for extracting the insertion member disposed between the half split elements of the clamping portion from the clamping portion; and
- a stopper wall, included in a periphery of the insertion member operating portion, to which the optical connector is abutted when the insertion member is extracted from the clamping portion of the optical connector,
- wherein the insertion member projects to an outer surface side of the stopper wall from a movable end portion, which is an end portion of the insertion member operating portion located opposite to the stopper wall of the insertion member operating portion, through an insertion member window formed in the stopper wall, and
- when lateral opposing forces are applied to portions of the insertion member operating portion located between the stopper wall and the movable end portion, the insertion member operating portion deforms such that a distance between the stopper wall and the movable end portion increases so that the insertion member is moved such that an amount of projection of the insertion member from the stopper wall decreases or projection of the insertion member from the stopper wall is eliminated.

2. An optical fiber connecting tool according to claim 1, wherein the connector holder further comprises a holder body having a groove-shaped accommodation recess for accommodating the optical connector, and
the insertion member operating portion has a structure in which the holder body and the movable end portion are joined by a pair of joining walls each of which comprises two joining plates joined by a hinge, so that the pair of joining walls deforms uniformly so as to allow the insertion members to move linearly with respect to the optical connector held in the holder body when the lateral opposing forces are applied to the insertion member operating portion.

3. An optical fiber connecting tool according to claim 1, comprising plural insertion members to be inserted between the elements of the clamping portion, which project from the movable end portion.

4. An optical fiber connecting tool according to claim 1, wherein the connector holder further comprises a holder body having a groove-shaped accommodation recess that accommodates the optical connector,
the insertion member operating portion has a polygonal shape that has a concave portion as viewed in a direction along which groove-shaped accommodation recess extends, and
the stopper wall forms a portion of the concave portion.

5. A tool equipped optical connector comprising:
an optical connector which houses a ferule, a first optical fiber mounted in the ferule and extending from a back end of the ferule, and a second optical fiber abutted and connected to the optical fiber, the optical connector comprising a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring; and
an optical fiber connecting tool according to claim 1, wherein the insertion member is disposed between the half split elements of the clamping portion of the optical connector.

6. A connector holder comprising:
- a holder body having a groove-shaped accommodation recess for accommodating an optical connector which houses a ferule, a first optical fiber mounted in the ferule and extending from a back end of the ferule, and a second optical fiber abutted and connected to the optical fiber, the optical connector comprising a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring;
- an insertion member operating portion, having a ring shape, in which the holder body is included as a portion of a periphery thereof; and
- an insertion member projecting from a movable end portion, which is an end portion of the insertion member operating portion located opposite to the holder body, into the accommodation recess, for maintaining a state in which the second optical fiber is insertable into and removable from the space between the half split elements by being wedged into the space from outside of the clamping portion so as to expand the space between the half split elements,
- wherein the insertion member operating portion extracts the insertion member disposed between the half split elements from the space between the half split elements by being applied lateral opposing forces to portions of the insertion member operating portion located between the holder body and the movable end portion, and thereby deforming such that a distance between the movable end portion and the holder body.

7. A connector holder according to claim 6, wherein the deformation of the insertion member operating portion is an elastic deformation.

8. A connector holder according to claim 6, wherein the insertion member operating portion has a structure in which the holder body and the movable end portion are joined by a pair of joining walls each of which comprises two joining plates joined by a hinge, so that the pair of joining walls deforms uniformly so as to allow the insertion members to move linearly with respect to the optical connector held in the holder body when the lateral opposing forces are applied to the insertion member operating portion.

9. A connector holder according to claim 6, comprising plural insertion members to be inserted between the elements of the clamping portion, which project from the movable end portion.

10. A connector holder according to claim 6, wherein a convex portion, which is engageable with a retainer for holding the optical connector in the accommodation recess, is formed on an end of the holder body located opposite to the insertion member operating portion.

11. A connector holder according to claim 6, wherein an engagement groove, which is engageable with a retainer for holding the optical connector in the accommodation recess, is formed in an end of the holder body located opposite to the insertion member operating portion.

12. A connector holder equipped optical connector comprising:

an optical connector which houses a ferule, a first optical fiber mounted in the ferule and extending from a back end of the ferule, and a second optical fiber abutted and connected to the optical fiber, the optical connector comprising a clamping portion, provided at a back portion of the ferule opposite to a distal end surface for abutment connection and having half split elements, for maintaining connection between the first optical fiber and the second optical fiber by clamping the first optical fiber and the second optical fiber in a space between the half split elements using elastic force of a spring; and a connector holder according to claim 6 mounted on the optical connector, wherein the insertion member of the connector holder is disposed between the half split elements of the clamping portion.

13. An optical fiber connecting tool for a clamping portion having half split elements for maintaining connection between optical fibers which are abutted and connected by clamping the optical fibers in a space between the half split elements using elastic force of a spring, the optical fiber connecting tool comprising:

an insertion member for maintaining a state in which one of the optical fibers is insertable into and removable from the space between the half split elements by being wedged into the space from outside of the clamping portion so as to expand the space between the half split elements;

an insertion member operating portion for extracting the insertion member disposed between the half split elements of the clamping portion from the clamping portion; and a stopper wall, joining peripheral ends of the insertion member operating portion, to which the clamping portion is abutted when the insertion member is extracted from the clamping portion, wherein the insertion member projects to an outer surface side of the stopper wall from a movable end portion, which is an end portion of the insertion member operating portion located opposite to the stopper wall of the insertion member operating portion, through an insertion member window formed in the stopper wall, and when lateral opposing forces are applied to portions of the insertion member operating portion located between the stopper wall and the movable end portion, the insertion member operating portion deforms such that a distance between the stopper wall and the movable end portion increases so that the insertion member is moved such that an amount of projection of the insertion member from the stopper wall decreases or projection of the insertion member from the stopper wall is eliminated.

14. An optical fiber connecting tool according to claim 13, wherein the stopper wall is provided on a holder body which accommodates the clamping portion.

15. A tool equipped optical connector comprising:

a clamping portion having half split elements for maintaining connection between optical fibers which are abutted and connected by clamping the optical fibers in a space between the half split elements using elastic force of a spring; and an optical fiber connecting tool according to claim 13 attached to the clamping portion so as to maintain a state in which one of the optical fibers is insertable into and removable from the space between the half split elements by inserting the insertion member into the space from outside of the optical connector so as to expand the space between the half split elements.

* * * * *